US010615844B2

(12) United States Patent
Dao et al.

(10) Patent No.: US 10,615,844 B2
(45) Date of Patent: Apr. 7, 2020

(54) SYSTEM AND METHOD FOR RELAYING DATA OVER A COMMUNICATION NETWORK

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/457,938

(22) Filed: Mar. 13, 2017

(65) Prior Publication Data

US 2017/0272121 A1 Sep. 21, 2017

Related U.S. Application Data

(60) Provisional application No. 62/308,584, filed on Mar. 15, 2016.

(51) Int. Cl.
*H04B 3/36* (2006.01)
*H04W 12/06* (2009.01)
*H04W 88/02* (2009.01)

(52) U.S. Cl.
CPC ............. *H04B 3/36* (2013.01); *H04W 12/06* (2013.01); *H04W 88/02* (2013.01)

(58) Field of Classification Search
CPC ....... H04W 12/04; H04W 12/06; H04W 4/70; H04W 76/14; H04W 88/02; H04B 3/36
See application file for complete search history.

(56) References Cited

U.S. PATENT DOCUMENTS

| | | | |
|---|---|---|---|
| 9,173,092 B1 | 10/2015 | Hohpe | |
| 9,173,093 B2 | 10/2015 | Rishy-Maharaj et al. | |
| 9,491,567 B2* | 11/2016 | Koo | ..................... H04W 4/005 |
| 2010/0125670 A1 | 5/2010 | Dondeti et al. | |
| 2010/0311322 A1 | 12/2010 | Bao et al. | |
| 2011/0038480 A1 | 2/2011 | Lin | |
| 2011/0305339 A1 | 12/2011 | Norrman et al. | |
| 2013/0183971 A1 | 7/2013 | Tamaki et al. | |
| 2013/0288642 A1 | 10/2013 | Yang | |
| 2014/0073330 A1 | 3/2014 | Pan et al. | |

(Continued)

FOREIGN PATENT DOCUMENTS

| | | |
|---|---|---|
| CN | 101150840 A | 3/2008 |
| CN | 101282570 A | 10/2008 |

(Continued)

OTHER PUBLICATIONS

International Search Report dated May 22, 2017 for corresponding International Application No. PCT/CN2017/076600 filed Mar. 14, 2017.

(Continued)

*Primary Examiner* — Khaled M Kassim
*Assistant Examiner* — Saad A. Waqas

(57) ABSTRACT

A system and method for exchanging data with a network including an authorized UE that is authorized to exchange the data with the network, and an unauthorized UE that is not authorized to exchange the data with the network. The unauthorized UE operable to receive an authorization credential, and to exchange the data with the network using the received authorization credential.

22 Claims, 7 Drawing Sheets

(56) References Cited

U.S. PATENT DOCUMENTS

| | | |
|---|---|---|
| 2014/0146757 A1 | 5/2014 | Han et al. |
| 2014/0286216 A1 | 9/2014 | Park et al. |
| 2014/0310782 A1 | 10/2014 | Vanderveen et al. |
| 2015/0012744 A1* | 1/2015 | Chen .................... H04W 12/04 713/155 |
| 2015/0127939 A1 | 5/2015 | Mazandarany et al. |
| 2015/0163840 A1 | 6/2015 | Ji et al. |
| 2015/0312758 A1 | 10/2015 | Redford et al. |
| 2016/0021691 A1 | 1/2016 | Lee et al. |
| 2016/0165325 A1 | 6/2016 | Coleman et al. |
| 2016/0309328 A1 | 10/2016 | Zhang et al. |
| 2016/0337853 A1 | 11/2016 | Abdulrahiman et al. |
| 2016/0353307 A1 | 12/2016 | Jung et al. |
| 2018/0152234 A1 | 5/2018 | Huang et al. |

FOREIGN PATENT DOCUMENTS

| | | |
|---|---|---|
| CN | 101453745 A | 6/2009 |
| CN | 102065424 A | 5/2011 |
| CN | 102215537 A | 10/2011 |
| CN | 102217274 A | 10/2011 |
| CN | 103686894 A | 3/2014 |
| CN | 104754575 | 7/2015 |
| CN | 104935375 | 9/2015 |
| CN | 106537943 A | 3/2017 |
| EP | 2833694 | 2/2015 |
| JP | 2007241720 A | 9/2007 |
| JP | 2015149724 A | 8/2015 |
| JP | 2016540420 A | 12/2016 |
| WO | 2010030020 A1 | 3/2010 |
| WO | 2012079629 | 6/2012 |
| WO | 2015059286 A1 | 4/2015 |
| WO | 2016010760 A1 | 1/2016 |

OTHER PUBLICATIONS

International Search Report dated May 22, 2017 for corresponding International Application No. PCT/CN2017/076651 filed May 31, 2017.
Huawei Technologies Co., Ltd., U.S. Appl. No. 15/457,998, filed Mar. 13, 2017, entitled "System and Method for Relaying Data Over a Communication Network"—Not Yet Published.
XP050972112 R2-152462 Ericsson,"Signalling required for UE-NW relay selection",3GPP TSG-RAN WG2 #90, Fukuoka, Japan, May 25-29, 2015,total 17 pages.
ZTE,"Relay selection and reselection",3GPP TSG RAN WG2 #90 R2-152547,Fukuoka, Japan, May 25-29, 2015,total 4 pages.

* cited by examiner

SYSTEM AND METHOD FOR RELAYING DATA OVER A COMMUNICATION NETWORK

CROSS-REFERENCE TO RELATED APPLICATIONS

This application claims priority from U.S. Patent Application No. 62/308,584, filed Mar. 15, 2016, and entitled "SYSTEM AND METHOD FOR RELAYING DATA OVER A COMMUNICATION NETWORK" the entirety of which is incorporated herein by reference.

FIELD OF THE INVENTION

The present invention pertains to the field of communication networks and in particular to a system and method for User Equipment (UEs) to communicate over a communication network. In an implementation, the present invention more particularly relates to a system and method for UEs to relay data over a communication network.

BACKGROUND

In third and fourth generation (3G/4G) communication networks (e.g. High Speed Packet Access (HSPA) and Long Term Evolution (LTE) networks), each UE has its own credential, or set of credentials, that is used by network entities to identify and authorize the UE to connect to the network. If a UE was not registered on a network, for instance a specific carrier's wireless network, then it is not able to send or receive information over the network. In some instances a UE without credentials to a network can still be authorized for unauthenticated access to emergency services, for the sake of simplicity, this type of access will be referred to as emergency access, and other forms of access will be simply referred to as access. Accordingly, in order to provide connectivity to a UE on a network, that UE must have an identity module that allows registration of its communications module (e.g. modem and transceiver) for operation on the network.

The functional limitation of this arrangement is that every UE must be registered on a network to receive information over the network. When a first UE is not registered for a network or is otherwise unable to access the network, and has traffic to be communicated using the otherwise inaccessible network, it can connect to a second UE that is registered for access to the network in question. The second UE can then act as a gateway for the first UE. All data traffic that passes through the second UE will be recognized, and charged, by the network as data traffic associated with the second UE. Typically, the connection between the first and second UEs makes use of a different radio access technology than the network connection (e.g. a UE connecting to a Long Term Evolution (LTE) network may act as a WiFi Access Point to provide network access to other UEs). It is envisioned that in some next generation radio access networks (e.g. so called Fifth Generation (5G) networks), UEs may be able to act as relays for other UEs, and the relay UE may not be subject to bearing the charges associated with the first UE, if the first UE, or a service accessed by the first UE, has agreed to bear the cost.

This arrangement limits connectivity to networks to cases where the two UEs are owned, or closely associated with one another, such that the user of the gateway UE is willing to assume responsibility, and pay the incurred charges, for data associated with the first UE. It also requires explicit actions to be taken by the user of the gateway UE (e.g. activation of a Wi-Fi hotspot function).

There is a need for a system and method for allowing more flexible communication over a network. In some implementations, there is a need for a system and method that allows for the relaying of data over a network.

A problem with conventional communication networks is providing access to a connecting device that may require assistance to connect to the network. A conventional solution has been to enable an authorized relay UE. A difficulty with this approach is that the connecting device loses its access to the network when the authorized relay UE is out of range of the connecting device, or otherwise unable to provide connectivity on behalf of the connecting device.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In an implementation, a system and method is provided for providing alternative relay connectivity to provide network access to a connecting device.

In an implementation, an unauthorized User Equipment (UE) for exchanging data with a network is provided. The unauthorized UE operable to: receive a subscription confirmation including an authentication credential; receive data associated with the authentication credential; and, exchange the received data with the network using the received authorization credential.

In some implementations, the unauthorized UE may be further operable to receive the authorization credential from an authorized UE, and, to receive the data from a connecting device. In some implementations, the unauthorized UE may be further operable to receive the authorization credential from an application server available on the network, and to receive the data from a connecting device. The authorization credential may be associated with the connecting device and the network may be operable to assign responsibility and charging for the data exchanged by the unauthorized UE under the authorization credential to the connecting device. In some implementations, the unauthorized UE may be further operable to transmit a subscription request towards an application server available on the network, and to receive the subscription confirmation from the application server.

In an implementation, a method is provided for exchanging data with a network. An application server of the network may receive a subscription request seeking authorization for an unauthorized UE, the subscription request including an unauthorized UE identifier; transmit a subscription confirmation confirming authorization for the unauthorized UE including an authentication credential; and, receive data from the unauthorized UE based on the authentication credential.

In some implementations of the method the subscription request may be received from an authorized UE that is currently authorized to exchange data with the network. In some implementations of the method the subscription request is received from the unauthorized UE, and before the application server transmits the subscription confirmation the method may further comprise: transmitting a verification request including the unauthorized UE identifier; and, receiving an acknowledgement authenticating the verification request. In some implementations of the method the verification request is transmitted to at least one of: an authorized UE; a connecting device; and, a second application server. In some implementations, before the application server transmits the subscription confirmation, the application may also: transmit the unauthorized UE identifier to a second application server on a second network; and, receive authentication of the unauthorized UE from the second application server. In some implementations, the exchange of data may be on behalf of a connecting device authorized on the network.

In an implementation, a method is provided for connecting an unauthorized UE to a network to exchange data. The method may include the unauthorized UE: transmitting towards an application server on the network a subscription request seeking authorization for an unauthorized UE, the subscription request including an unauthorized UE identifier; receiving a subscription confirmation confirming authorization for the unauthorized UE including an authentication credential; and, exchanging data with the network based on the authentication credential.

In some implementations, before the subscription request is transmitted, the method further comprises the unauthorized UE: receiving a subscription request to exchange data on behalf of a connecting device; and, transmitting the subscription request to the network for the connecting device.

In an implementation, a method is provided for connecting an unauthorized UE to a network to exchange data, comprising an authorized UE: transmitting to an application server on the network a subscription request seeking authorization for an unauthorized UE, the subscription request including an unauthorized UE identifier; receiving a subscription confirmation confirming authorization for the unauthorized UE including an authentication credential; and, transmitting the authentication credential to the unauthorized UE.

In some implementations, after the receiving the subscription confirmation, the method further comprises the authorized UE: transmitting a handover notification to a connecting device including the unauthorized UE identifier, the handover notification enabling the connecting device to access the network through the unauthorized UE.

In an implementation, an application server is provided. The application server available on a network and operable to: receive a subscription request seeking authorization for an unauthorized UE, the subscription request including an unauthorized UE identifier; transmit a subscription confirmation confirming authorization for the unauthorized UE including an authentication credential; and, receive data from the unauthorized UE based on the authentication credential.

In some implementations, the subscription request is received from an authorized UE that is currently authorized to exchange data with the network. In some implementations, the subscription request is received from the unauthorized UE, and wherein the application server is further operable to: transmit a verification request including the unauthorized UE identifier; and, receive an acknowledgement authenticating the verification request. In some implementations, the verification request is transmitted to at least one of: an authorized UE; a connecting device; and, a second application server. In some implementations, before the application server transmits the subscription confirmation, the application server is operable to: transmit the unauthorized UE identifier to a second application server on a second network; and, receive authentication of the unauthorized UE from the second application server. In some implementations, the exchange of data is on behalf of a connecting device authorized on the network.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
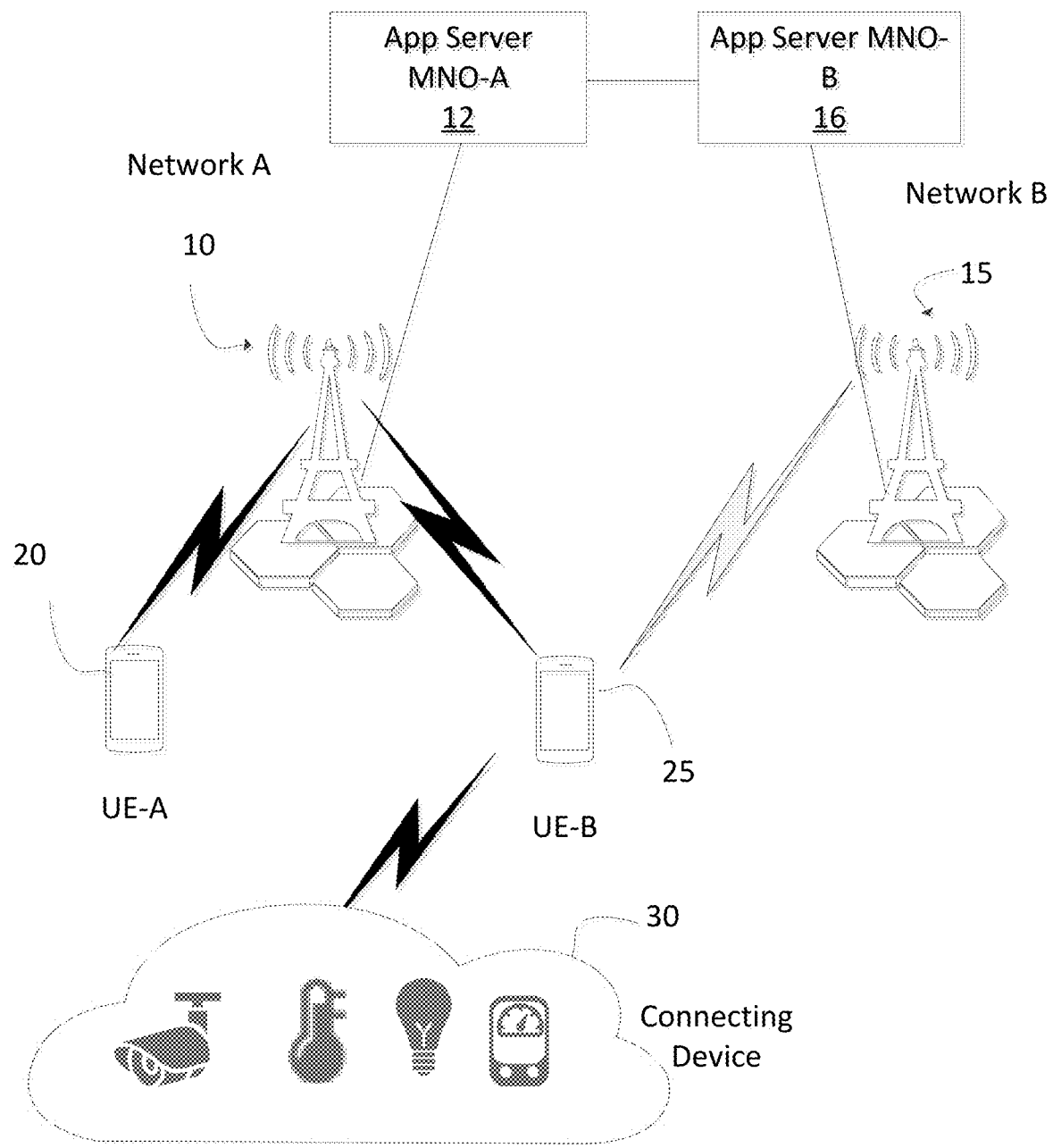
FIG. 1 illustrates an implementation of a system for relaying data over one or more networks.

The present application relates to a system and method for providing alternative connectivity to a network. In particular, the present application relates to a system and method for relaying data to a network.

In some proposed networks, such as next generation networks including proposed 5G networks, there may be additional flexibility in handling the identity of connected UEs, as well as for providing new modes of connectivity for non-connected UEs. In the following description and accompanying FIGS. a UE in the form of a wireless-enabled mobile communications device such as a smartphone, denoted by User Equipment (UE), is used for illustrative purposes only. It is understood and intended that the present application provides a system and method applicable to a range of electronic devices including UEs, autonomous machines and other devices that connect to a mobile network. The term "UE" is used for simplicity but should be understood to also refer to electronic devices that connect to a wireless network, User Equipment (UE) as defined under the 3GPP standards, fixed wireless terminals, and other such devices that make use of a wireless network connection. The term "connecting device" is used herein to describe a computing device that requires the assistance of a UE to gain access to a network. The connecting device may be a UE, or may be a non-connected electronic device, such as an Internet of Things (IoT) device (also known as machine-to-machine device or a Machine Type Communications (MTC) device), that relies upon a UE to access the network.

In some implementations, the present application provides a mechanism to enable UEs to share their network authorization to either obtain access to their authorized network by sending data to the network through a relay UE, or to grant network authorization to be used by another UE that would not otherwise be authorized on the network.

In an embodiment, the system and method relates to a method for passing an authorization credential from an authorized UE to another unauthorized UE. The authorization credential may be transferred directly from the authorized UE to the unauthorized UE, or may be transferred from an application server available on the network to the unauthorized UE. The unauthorized UE can use the authorization credential to gain access to and communicate with the network. The "unauthorized" UE is referred to as unauthorized as it cannot access the network without receiving the authorization credential. The use of the authorization credential can allow the unauthorized UE to access the network with limitations or restrictions on its access rights. In the absence of the authorization credential, the unauthorized UE would not be able to connect to the network. The term "unauthorized" is used to indicate that the UE is not authorized to carry out specified communications without the authorization credential on a particular network, and is not an indication that the UE is otherwise unable to communicate with a network on its own behalf. The unauthorized UE may be a subscriber to the network, or to another network, for the purpose of communicating on its own behalf. It should also be noted that if two UEs are authorized to access the same network, but the first UE is using the authorization credentials of the second UE, for the purposes of the following discussion, the first UE will be referred to as being unauthorized.

In some implementations, an unauthorized UE may be set to begin acting as a relay in an automated fashion to provide support to a connecting device without user input. In these implementations, an unauthorized UE, may request the authorization credential from the authorized UE. Upon receipt of the authorized credential, the unauthorized UE can connect to the network and being to act as a relay for the connecting device. The unauthorized UE may be set to validate the request, receive the authorization credential, and conduct relay communications using the authorization credential without requiring authorization input from a user of the unauthorized UE. The negotiation between the requesting UE and the unauthorized UE or connecting device may be conducted using a short-range communications protocol.

In some implementations, the negotiation between an existing authorized UE and the unauthorized UE may be conducted over a wireless network. In some implementations, this negotiation is conducted in response to a request to one of the authorized and unauthorized UEs transmitted by a connecting device. An unauthorized UE having connectivity to a service provider may grant use of its network access to the connecting device, and provide that connectivity based on a received authorization credential associated with the authorized UE or the connecting device.

In an implementation, the unauthorized UE is not initially authorized on the network. In this implementation, passing the authorization credential, from the authorized UE or network, to the unauthorized UE allows the unauthorized UE register to the network under the authorization of the authorized UE. After attaching and registering using a credential associated with the authorized UE, the unauthorized UE can communicate directly with the network. This implementation permits the unauthorized UE to now communicate with the network despite the fact that it does not have its own network authorization credentials.

In an alternate implementation, as indicated above the unauthorized UE may be a subscriber and able to communicate with either the network or a second network. In this alternate implementation, passing the authorization credential to the unauthorized UE similarly allows the unauthorized UE to assume the authorization of the authorized UE and henceforth communicate directly with the network based upon the authorization credential of the authorized UE.

In an implementation, the unauthorized UE may relay data received from the first authorized UE, or a third party UE, to the network using the authorization credential.

In an implementation, the unauthorized UE may communicate its own data to the network using the authorization credential. Responsibility and charging for the data transferred under the authorization credential may remain with the UE that granted the authorization credential.

In an implementation, the unauthorized UE may be operative to selectively communicate directly with the network, or the second network, either based upon its own subscription information, or based upon the received authorization credential. The selective communication may be made, for example, based upon a characteristic of the data being communicated. In an implementation, the selective communication may be made such that data associated with the unauthorized UE is communicated using its own subscription, and data associated with either the authorized UE or a third party UE is communicated using the received authorization credential. Accordingly, the unauthorized UE may be operable to select the authorization credential for use with a pre-defined data type for communicating that data type to a recipient network.

In a further alternate implementation, the unauthorized UE may be a subscriber on a second network, but not the first network. In this further alternate implementation, network conditions may make it desirable to offload communications traffic from the first network onto the second network. In order to offload the communications, an authorization credential may be passed to the unauthorized UE to grant it authorization to relay specified communications, that were previously being exchanged over the first network, on the second network on behalf of another UE. Accordingly, the unauthorized UE may be authorized to exchange communications with the second network on behalf of the authorized UE, which may be a subscriber of the first network, but not the second network.

In an implementation, a system may be provided that is operable to detect a location of the authorized UE and to limit a validity of the authorization credential to a limited geographical zone or area. In some embodiments, the limited geographical zone may be based in a relation with the detected location, such as a distance from the detected location. In some embodiments, the limited geographic area may be specified using geographic coordinates, geographic landmarks, etc. In an implementation, the network may be operable to detect a location of the authorized UE and to initiate a subscription initiation on the basis of the location coinciding with a limited geographical zone about a third connecting device that requires assistance to gain connectivity to the first network.

In an implementation, a system is provided for exchanging data with a network. The system may include an authorized UE that is authorized to exchange the data with the network and an unauthorized UE that is not authorized to exchange the data with the network. The unauthorized UE being operable to receive an authorization credential, and to exchange the data with the network using the received authorization credential. The unauthorized UE may receive the authorization credential from either the authorized UE or the network In some implementations, the authorized UE may be a connecting device that is seeking access to the network, and grants the authorization credential to the unauthorized UE to enable the unauthorized UE to act as a relay on behalf of the connecting device. In some implementations, the authorized UE may be a relay UE that is providing access to the network on behalf of another connecting device.

In an implementation of the system, the authorization credential is associated with the authorized UE, and the network is operable to assign responsibility and charging for the data exchanged by the unauthorized UE under the authorization credential to the authorized UE.

In an implementation, in addition to the authorized UE and the unauthorized UE, the system may include a connecting device operable to generate the data for exchange with the network. In the implementation, the unauthorized UE is further operable to receive the data from the connecting device and to relay the data to the network on behalf of the UE using the authorization credential. In some implementations, the authorization credential may be associated with the connecting device, and the network may be operable to assign responsibility and charging for the data exchanged by the unauthorized UE under the authorization credential to the connecting device.

Referring to FIG. 1, a simplified exemplar representation of a system for relaying data over one or more networks is depicted. In FIG. 1, two mobile networks (MNO-A & MNO-B), network A 10 and network B 15 are illustrated. Also illustrated are exemplary application servers (MNO-A application server 12 and MNO-B application server 16) that provide services on each of network A 10 and network B 15. The application servers 12, 16 being servers located either inside or outside a network operator's network and operative to support the systems and methods described herein. Optionally, as illustrated, the application servers 12, 16 may have direct connection to one another to provide cross-network communications. In some implementations, the application servers 12, 16 may comprise part of an eNB of the network A 10 or network B 15. In some implementations, the application servers 12, 16 may be connected to one or more eNB that provide access to UE connecting to the network A 10 or network B 15. In other embodiments the application servers may reside outside of Network A and Network B, for example the application server may be in the Internet.

In the example of FIG. 1 an authorized UE 20, denoted by UE-A, is authorized on network A 10. In this example, an unauthorized UE 25, denoted by UE-B, subscribes to network B 15, but is not normally authorized on network A 10. At least one connecting device 30 is authorized on network A 10, but does not have direct connectivity with network A 10. In some implementations, the lack of connectivity may be by option or design, rather than a permanent condition. In the example, the unauthorized UE 25 has received an authorization credential granting the unauthorized UE 25 authorization on network A 10 to communicate data on behalf of the connecting device 30. In other implementations, the unauthorized UE 25 may receive an authorization credential granting the unauthorized UE 25 authorization on network A 10 to communicate data on its own behalf. In both cases, the communication with the network A 10 is under a separate authorization identity, rather than an identity of the unauthorized UE 25. In some implementations, the authorization credential may be time limited, location limited, service limited, or otherwise constrained.

In an implementation, the application servers 10, 12 may be operable to exchange identity confirmation information as necessary to confirm an identity of the authorized UE 20, the unauthorized UE 25, and/or the connecting device 30. In the implementation, for instance, the network A 10 may not know an identity of the unauthorized UE 25, but may verify the identity by exchanging corresponding identity confirmation information with the network B 15.

In an implementation, the unauthorized UE 25 may be a subscriber on network A 10, but receives the authorization credential for the purpose of assigning responsibility and charging for data it transfers on behalf of the connecting device 30. Accordingly, the second UE 25 is "unauthorized" with respect to specified data it wishes to convey on a particular network, or to represent itself as a particular identity on the network. For instance, the granted authorization credential may allow the unauthorized UE 25 to assume a virtual identity for the purpose of any of:

accessing a network on its own behalf;
relaying data on behalf of another connecting device 30 on a network 10 for which it is a subscriber;
relaying data on behalf of connecting device 30 on a network for which it lacks authorization; and,
offloading data from one network A 10 and relaying the data onto another network B 15 on behalf of either network A 10 or network B 15.

In the example, the authorization credential was granted for the purpose of allowing the connecting device 30 to connect to a service on network A 10. Accordingly, while the transceiver and modem of the unauthorized UE 25 are being used to connect with network A 10, the connection is recognized as one being authorized on behalf of the connecting device 30 and responsibility and charging for that connection remain associated with the connecting device 30.

In the example of FIG. 1, the connecting device 30 is illustrated as an exemplary "Internet-of-Things" (IoT) device to illustrate that the connecting device 30 may not have direct connectivity to network A 10. Instead, connecting device 30 is reliant on UEs, such as the authorized UE 20 and, if necessary, the unauthorized UE 25, to provide access to network A 10. In an implementation, the connecting device 30 may be a gateway UE that provides connectivity for other UEs. In an implementation, the connecting device 30 may have the capability to connect to the network A 10, but may primarily (or alternatively) employ a relaying UE such as the authorized UE 25 in order to reduce transmission energy requirements, to simplify management of the network A 10, and/or other relevant purposes.

By way of example, a functional usage of the embodiment of FIG. 1 may be that the connecting device 30 primarily uses the authorized UE 25, which is authorized on network A 10, to relay the connecting device's communications to services available on network A 10. The authorization and charging for the connecting device 30 may be different from the authorization, charging, and other traffic typically communicated by the authorized UE 20.

For instance, the connecting device 30 could be a utility meter or an automobile that connects through network A 10 to a dedicated service to receive and transmit a limited data set. Rather than providing a complete transceiver and modem for the connecting device 30, or to provide connectivity when the connecting device 30 is out of range of network A 10, the connecting device 30 may rely upon close range communications to a local gateway or user's smartphone as the authorized UE 20 to provide connectivity to network A 10 as necessary. In cases where the authorized UE 20 is unable to provide connectivity, the authorization credential of either the authorized UE 20 or the connecting device 30 may be transferred to the unauthorized UE 25 to enable connectivity to the network A 10 under the transferred authorization. The authorized UE 20 may be unable to provide connectivity, for instance, in cases where it has low power, is out of range of the connecting device 30, or is otherwise unable to provide the service. In any of these cases, connectivity to network A 10 may be provided to the connecting device 30 by the unauthorized UE 25 irrespective of whether the unauthorized UE 25 is a subscriber on the network A 10, and to ensure authorization and charging for that connection remain the responsibility of the connecting device 30.

As also indicated above, a similar exchange may happen between the authorized UE 20 and the unauthorized UE 25 to permit the authorized UE 20 to communicate to the network A 10 through the unauthorized UE 25 acting as a relay. In this instance the functionality is the same, except that operations of the connecting device 30 described above are also effected by the authorized UE 20.

As an initial step a requirement to establish a new authorized connection with the network A 10 must be communicated and established between the relevant parties. Depending upon the implementation, the initiating party may be any of the network A 10, the authorized UE 20, the unauthorized UE 25, or the connecting device 30. After the requirement to establish a new connection has been established, the unauthorized UE 25 must be authenticated and receive an authorization credential. In two main embodiments, either the authorized UE 20 or the unauthorized UE 25 may submit a subscription request to the network A 10 as an initiating step to establish the new authorized connection.

Figure 2A:
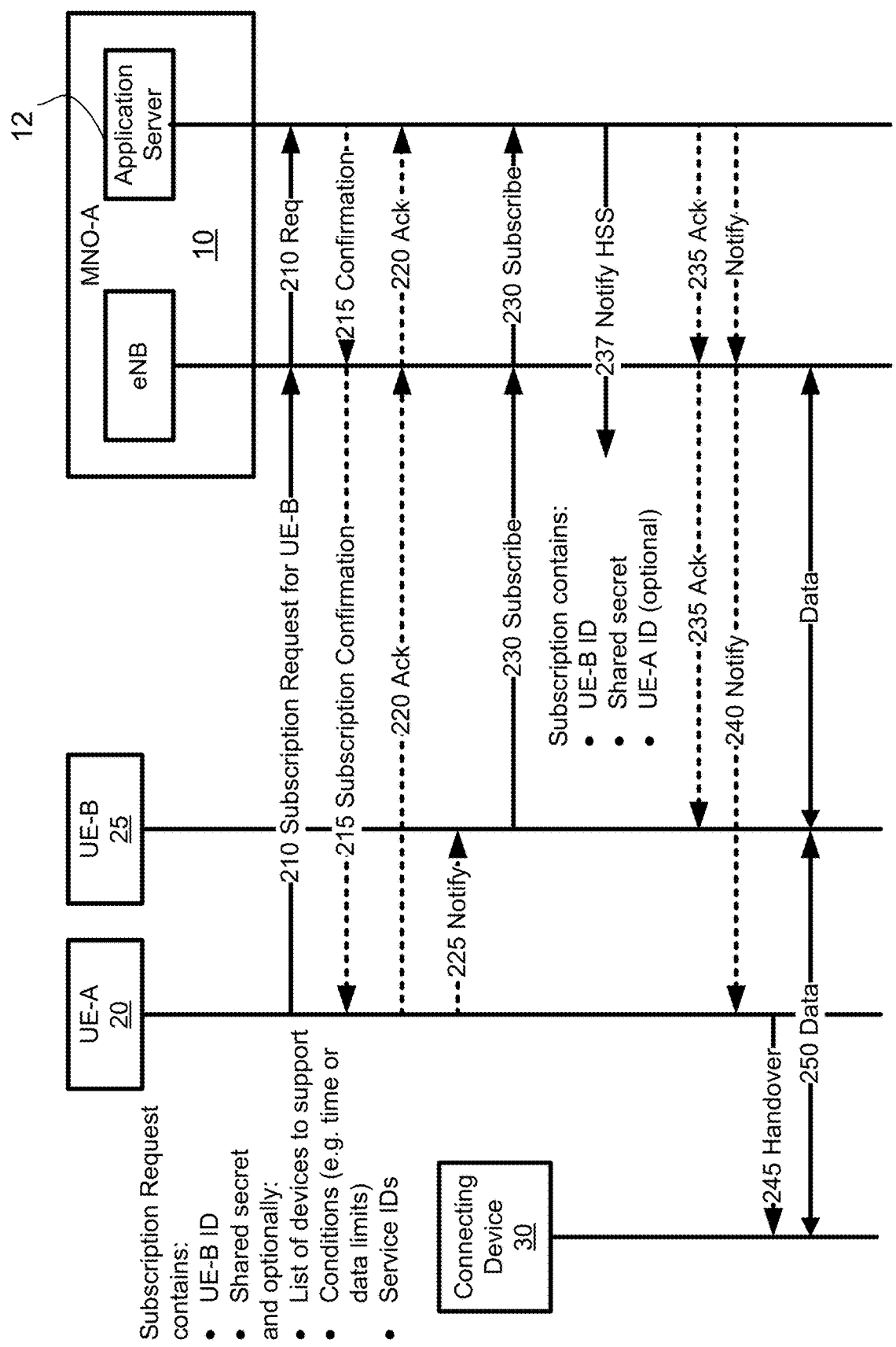
FIGS. 2A and 2B illustrate implementations of a system for submitting a subscription request for relaying data.

FIG. 2A is a signalling diagram illustrating an embodiment of a system and method for the authorized UE 20 (denoted as UE-A) to submit a subscription request to the application server 12 on behalf of the unauthorized second UE 25 (denoted as UE-B) in order to transfer data handling for the connecting device 30 (such as an IoT UE/gateway) from the authorized UE 20 to the unauthorized UE 25.

In this embodiment, an authorized UE 20 initiates correspondence on behalf of the unauthorized UE 25. In step 210 an authorized UE 20 may submit a subscription request in the form of a request to authorize seeking an authorization credential on behalf of an unauthorized UE 25 by transmitting the subscription request to an application server 12 available on the network A 10. In response to receiving the subscription request, in step 215 the application server 12 may reply to the authorized UE 20 with a subscription confirmation including an authorization credential. The subscription confirmation may include the original message transmitted by the authorized UE 20, or a hash, certificate, signature, or other cryptographic processed version of the original message to allow the authorized UE 20 to authenticate the acknowledgement. In some implementations, the subscription confirmation may include security information to be used by the unauthorized UE 25 when subscribing. Preferably, after authenticating the subscription confirmation, in step 220 the authorized UE 20 will further transmit an acknowledgement confirming receipt of the subscription confirmation to the application server 12. The subscription request, confirmation, and acknowledgement exchange may comprise an encrypted communication between the authorized UE 20 and the application server 12.

In step 225 the authorized UE 20 will transmit a notification to the unauthorized UE 25, indicating that the subscription request transmitted to the application server 12 has been validated. In some implementations, the notification transmitted in step 225 may further include security information to be used by the unauthorized UE 25 when subscribing to the application server 12.

In an implementation, the subscription request transmitted in step 210 may comprise an identifier and authentication information. The identifier may comprise, for instance, some or all of a telephone number, International Mobile Station Equipment Identity (IMEI), International Mobile Subscriber Identity (IMSI), Media Access Control address (MAC), or other identifying information of the unauthorized UE 25.

The authentication information may comprise, for instance, some or all of a passkey, credential, certificate, hash, passcode, or other security information to be used by the unauthorized UE 25 to verify and/or authenticate itself with the network A 10.

In an implementation, the subscription request may further comprise any of the following optional components:
  identifier(s) of connecting device(s) 30 transmitting data to the unauthorized UE 25 to be exchanged with the network A 10 using this authorization credential;
  an authorization duration defining a connectivity time for the unauthorized UE 25 under this authorization credential;
  a service ID to identify the service on the network A 10 that is subject to the authorization credential; and,
  other information relevant to defining the scope of the authorization credential and the parties that are subject to the authorization credential.

In order for the unauthorized UE 25 to then communicate over the network A 10, if it is not a subscriber to the network A 10, it must itself be authorized on the network A 10 for the purposes defined by the authorization credential. In some cases, the unauthorized UE 25 may be subscribed to the network A 10 for its own connectivity and data transfer, and does not require further authorization to obtain connectivity on its own behalf. In these cases, the authorization credential need only authorize the unauthorized UE 25 to transfer the data on behalf of the connecting device 30. In some implementations, the unauthorized UE 25 may wait to receive the notification transmitted in step 225 before exchanging data on behalf of the connecting device 30.

In other cases, the unauthorized UE 25 is either not subscribed to the network A 10, or may require authorization in order to relay communications on behalf of the connecting device 30 to the network A 10. In these cases, the unauthorized UE 25 waits to receive the notification transmitted by the authorized UE 20 in step 225 that may include a subscription confirmation indicating that the unauthorized UE 25 has been authorized as a correspondent and has been subscribed on the network A 10. The subscription confirmation may arrive as part of the acknowledgement, or may be transmitted as a separate message. For example, in some implementations, the subscription confirmation may be a SMS (Short Message Service) message sent from the authorized UE 20 to the unauthorized UE 25. The SMS message may include the authentication information, such as a passcode, that can be used by the mobile network A 10 in the process of identifying and authenticating the unauthorized UE 25. As an alternate example, a direct UE-to-UE communication channel can be established between the authorized UE 20 and the unauthorized UE 25 to exchange the subscription confirmation.

In an implementation, the subscription confirmation may include information based on the authentication information submitted as part of the subscription request. In a second implementation, the authentication information may have previously been exchanged between the authorized UE 20 and the unauthorized UE 25. In both cases, the authorized UE 20 communicates that the subscription has been confirmed to the unauthorized UE 25 and typically includes security information to enable the unauthorized UE 25 to identify itself with the application server 12.

In either case, after receiving the notification, in step 230 the unauthorized UE 25 transmits a subscription to the application server 12 that forms an authorization request for gaining connectivity to the network A 10. The subscription including at least the identifier and UE authentication information, such as the authentication information included in the subscription request, or cryptographic information related to the authentication information that may be used by the application server 12 to authenticate the unauthorized UE 25 based upon the subscription request received from the authorized UE 20. The UE authentication information may further comprise authorized UE 20 identifying information, such as a certificate or other identifying cryptographic information, that may be used by the application server 12 to confirm that the subscription relates to that subscription request. The subscription may further include the identifier(s) of UE(s) transmitting data to the unauthorized UE 25 and/or the service ID, and/or the other information relevant to defining the scope of the authorization and the parties that are subject to the authorization.

In response to receiving the subscription, the application server 12 may verify the authorization request, including by processing the received UE authentication information using the authentication information received from the authorized UE 20. After verifying the authorization request, in step 235 the application server 12 may send a subscription acknowledgement, in the form of an authorization credential, to the unauthorized UE 25. In some implementations, the application server 12 may further define a security profile for the unauthorized UE 25 for its communications under the authorization. In some implementations of the above described systems and methods the authorization credential may be restricted for operation within a limited geographic range and/or a time duration.

Depending upon the implementation, in step 237 the application server 12 may further send a notification to a home subscriber service (HSS) operative on the network A 12 to authenticate the unauthorized UE 25 on the network A 12 for the limited purposes defined by the subscription request. In some implementations, the application server 12 provides the HSS. In these implementations, the notification to the HSS comprises an internal process of the application server 12.

The unauthorized UE 25 may now communicate with the network A 10 on behalf of the connecting device 30 using the received authorization credential, though the unauthorized UE 25 itself may not be "authorized" for the communication or service. For example, the unauthorized UE 25 may transmit data received from the connecting device 30, to a node in the subscribed network A 10.

Service access and charging may be applied for communications exchanged under the received authorization credential to an authorized identity associated with the received authorization. Accordingly, security and charging may be applied specific to the data exchanged under the received authorization. The authorized identity associated with the received authorization credential may typically be a separate identity from that of the unauthorized UE 25. As indicated above, the authorized identity associated with the received authorization may, for instance, be associated with the authorized UE 20 or the connecting device 30.

As an example, the authorized UE 20, or connecting device 30, may be subscribed to the network A 10. The transfer of the authorized credential may effectively extend coverage of the subscription to the unauthorized UE 25, under the terms defined in the subscription request.

In an implementation, the method may further include step 240, the application server 12 transmitting a handover notification to the authorized UE 20. Upon receipt of the handover notification, in step 245 the authorized UE 20 may, in some implementations, transmit a handover notification to the connecting device 30.

Figure 2B:
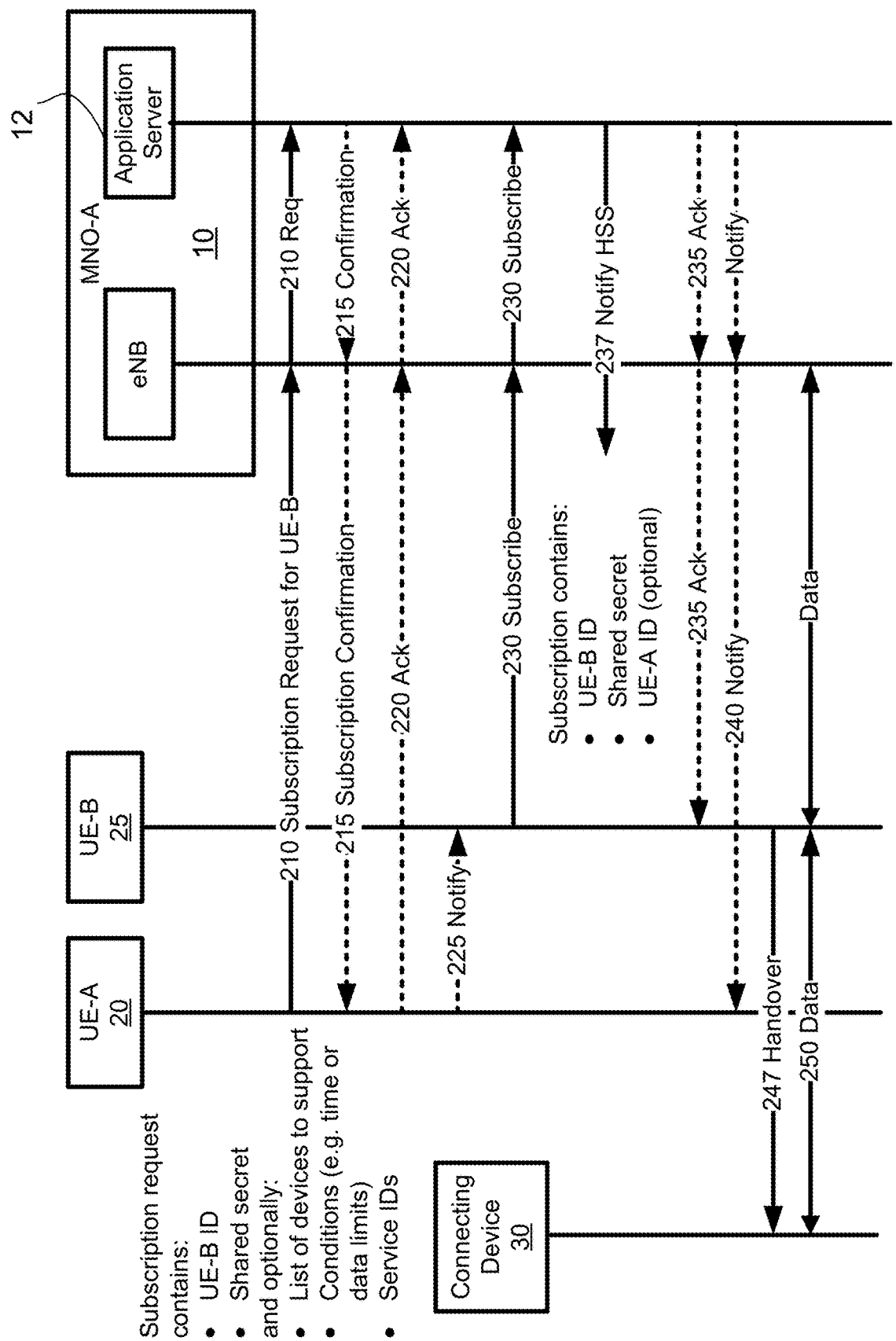

Referring to FIG. 2B, in some implementations the unauthorized UE 25, may in step 247 transmit the handover notification to the connecting device 30. In these implementations, the UE 25 may include a connecting device authorization credential that allows the connecting device 30 to confirm that the UE 25 is authorized and subscribed to carry the service. In the embodiment of FIG. 2B, the authorized UE 20 does not transmit a handover to the connecting device 30. In step 250, the connecting device 30 may exchange data with the network 10 using the unauthorized UE 25 as a relay to transmit data received from the connecting device 30, to a node in the subscribed network A 10.

Figure 3A:
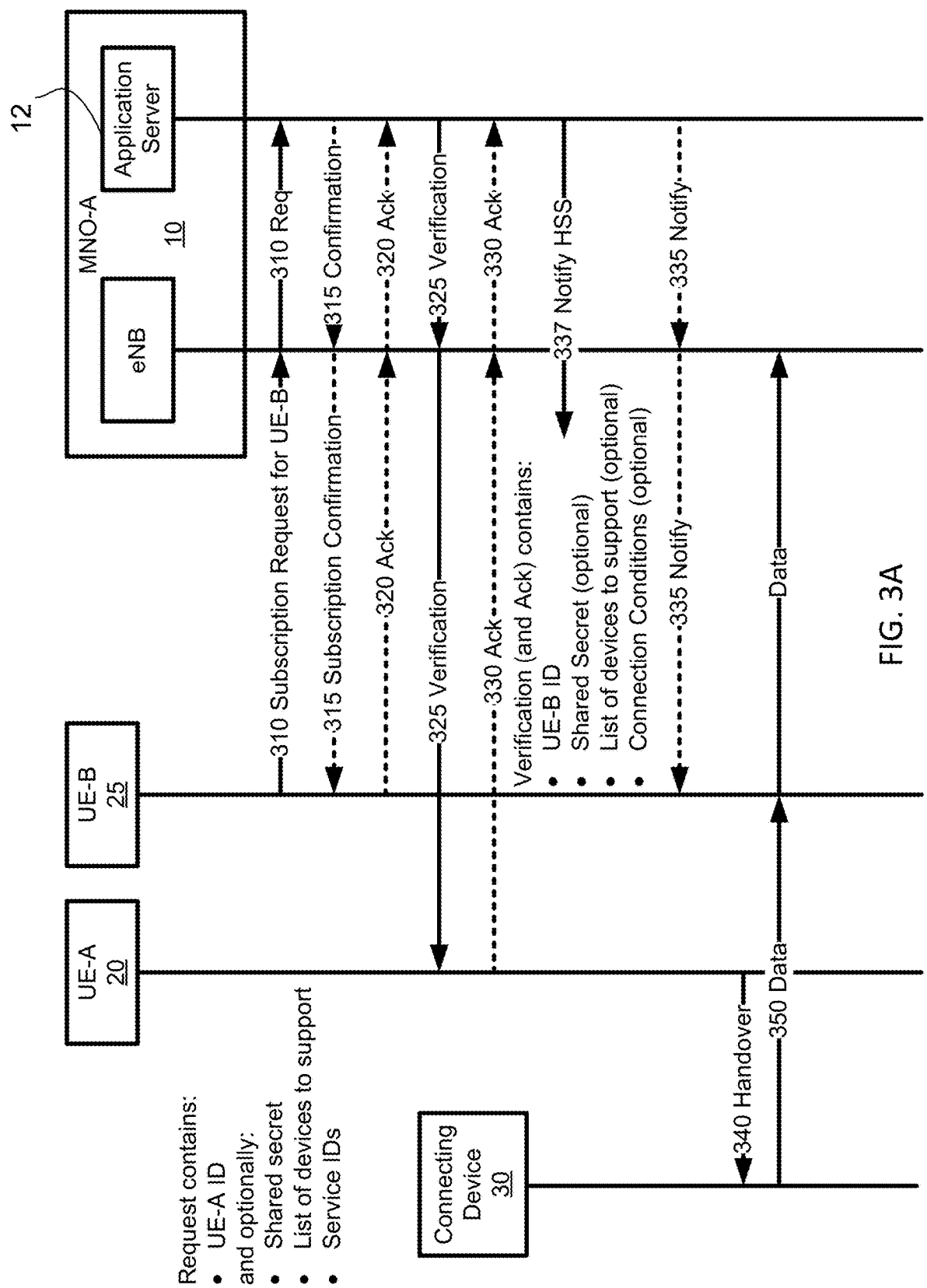
FIGS. 3A and 3B illustrate implementations of a system for submitting a subscription request for relaying data.

Referring to FIG. 3A, in an implementation the unauthorized UE 25 may directly submit a subscription request for authorization to the application server 12. The subscription request including an authorized UE identifier, and authentication information relating to the unauthorized UE 25. Optionally, the subscription request may include a shared secret, a list of UEs/devices to support, and/or service identifiers. In step 310 the unauthorized UE 25 transmits a subscription request to the application server 12. In response to receiving the subscription request in step 315 the application server 12 may transmit a subscription confirmation to the unauthorized UE 25 including an authorization credential.

In an implementation, the subscription request may require the exchange of subscription information related to the subscription request between the unauthorized UE 25 and the application server 12. The subscription information including an authentication credential of an authorizing UE, such as authorized UE 20 or connecting device 30, to enable the application server 12 to confirm that the unauthorized UE 25 is authorized to make the subscription request. The subscription information may be provided directly by the unauthorized UE 25, or may be obtained by the application server 12.

In an implementation, the application server 12 may obtain subscription information from an authorized correspondent such as the authorized UE 20. In an implementation, the application server 12 may seek confirmation by sending a verification request to the unauthorized UE 25 to forward to the authorized UE 20. An acknowledgment to the verification request being returned to the application server 12 by either the unauthorized UE 25 or the authorized UE 20. In an implementation, as illustrated in FIG. 3A, the application server 12 may seek confirmation by, in step 325, transmitting a verification request to the authorized UE 20. The authorized UE 20 may, in step 330, transmit to the application server 12 an acknowledgement that authenticates the verification request. In an implementation, the verification and acknowledgement may include an unauthorized UE identifier as well as authentication information. Optionally, the verification and acknowledgement may include a shared secret, a list of UEs/devices to support, and/or connection conditions.

In an optional implementation, application server 12 on the network A 10, may employ a server authentication by forwarding the identifier from the subscription request to a second application server on a second network, e.g. the MNO-B application server 16 on the network B 15, and request authentication of the unauthorized UE 25 from the MNO-B application server 16. In this implementation, the unauthorized UE 25 may be authenticated by another server or network that offers services to which the unauthorized UE 25 is subscribed. The authentication returned by the MNO-B application server 16 may include status information such as: confirmation of the capability and reliability of the unauthorized UE 25 to provide relay services to the connecting device 30, a credit profile, and a legal status. In situations where the unauthorized UE 25 is already a subscriber on the first network (network A 10), the application server 12 may directly verify the validity of the unauthorized UE 25 by accessing a validity service available on the network A 10. In these implementations, the second server may be available on the network A 10.

In an implementation, the exchange of subscription information may comprise a request from the application server 12 to the unauthorized UE 25 for information related to the subscription request. The unauthorized UE 25 may return the requested related information to the application server 12. In some implementations, this exchange of subscription information may comprise, for instance, a challenge and response in the form of an authentication procedure to confirm the identity of the connecting device 30 making the request. The challenge and response may comprise the exchange of certificate information from the application server 12 to the unauthorized UE 25, the certificate information to be authenticated based upon authenticating information received from the connecting device 30 or the authorized UE 20. The authenticated certificate information may be returned to the application server 12 to provide confirmation that the unauthorized UE 25 is acting on behalf of the authorized UE 20 or the connecting device 30. In an implementation, the authentication may comprise the unauthorized UE 25 requesting confirmation information from the authorized UE 20 or the connecting device 30 based upon the certificate information, and receiving the confirmation information from the authorized UE 20 or the connecting device 30 to either further process at the unauthorized UE 25, and/or to forward to the application server 12.

After receiving the acknowledgement transmitted by the authorized UE in step 330, the application server 12 transmits a notification to the unauthorized UE 25 as described above with reference to FIG. 2A. The application server 12 may further in step 335 notify HSS that the unauthorized UE 25 has been authorized for the limited purposed defined by the subscription request. In some implementations, the application server 12 provides the HSS. In these implementations, the notification to the HSS comprises an internal process of the application server 12.

In an implementation, the method may further include step 340, the authorized UE 20 transmitting a handover notification to the connecting device 30. After receiving the handover notification, in step 350 the connecting device 30 may proceed to exchange data using the unauthorized UE 25 as a relay to transmit data received from the connecting device 30, to a node in the subscribed network A 10.

Figure 3B:
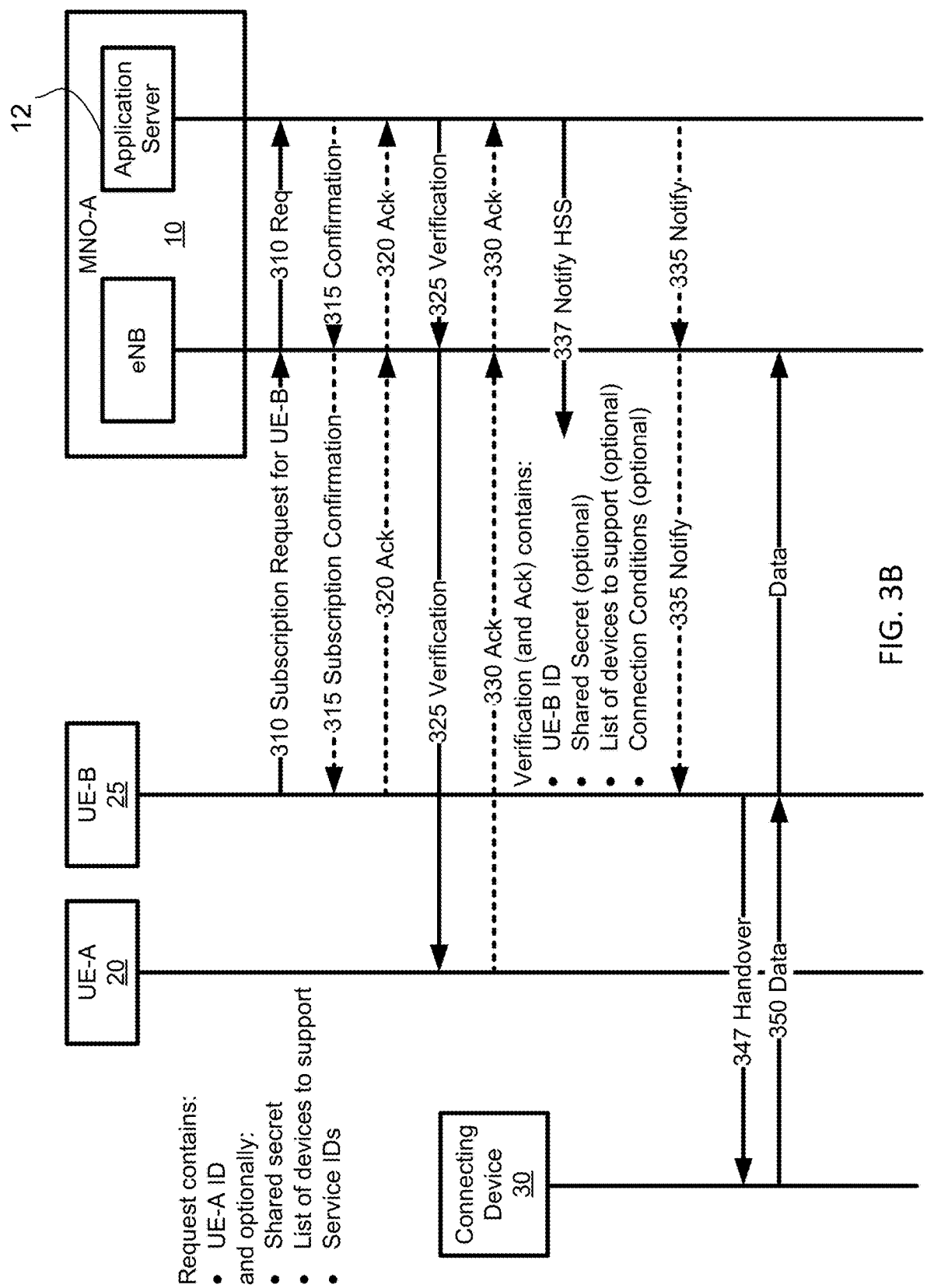

Referring to FIG. 3B, in some implementations the unauthorized UE 25, may in step 347 transmit the handover notification to the connecting device 30. In these implementations, the UE 25 may include connecting device authorization credential that allows the connecting device 30 to confirm that the UE 25 is authorized and subscribed to carry the service. In the embodiment of FIG. 3B, the authorized UE 20 does not transmit a handover to the connecting device 30. In step 350, the connecting device 30 may exchange data with the network 10 using the unauthorized UE 25 as a relay to transmit data received from the connecting device 30, to a node in the subscribed network A 10.

In an embodiment, the unauthorized UE 25 may request access to the network A 10 from the authorized UE 20 to initiate the subscription request. In an implementation, the unauthorized UE 25 may request the access on its own behalf. In an alternate implementation, the unauthorized UE 25 may request the access on behalf of the connecting device 30. In either case, the unauthorized UE 25 sends a subscription request to the authorized UE 20.

The authorized UE 20 may respond to the subscription request in two alternative subscription implementations.

In the first subscription implementation, the authorized UE 20 may submit the subscription request, as an authorized correspondent, directly to the application server 12 on the network A 10 as depicted in FIGS. 2A & 2B and described above. In this implementation, the subscription request sent by the unauthorized UE 25 to the authorized UE 20 may comprise identifying information of the unauthorized UE 25 and/or the connecting device 30.

In response to receiving the subscription request comprising the identifying information, the authorized UE 20 may process the subscription request, for instance to authenticate a user of the unauthorized UE 25 or to receive user input at the authorized UE 20 to obtain user authorization for the subscription. Alternatively, the authorized UE 20 may refer to a whitelist, a blacklist, certificate list, or other authentication reference to determine whether the identifying information corresponds with a UE that is authorized to connect to the network A 10.

The authorized UE 20 may then communicate the processed subscription request to the application server 12 to submit and register the unauthorized UE 25 as an authorized correspondent as indicated above with respect to FIGS. 2A and 2B. In this implementation, the processed subscription request sent to the application server 12 includes sufficient identifying information of the unauthorized UE 25 for the network A 10 to identify the unauthorized UE 25 as an authorized correspondent when contacted directly by the unauthorized UE 25. The identifying information may comprise, for instance, a certificate associated with the unauthorized UE 25 or the connecting device 30.

In the second subscription implementation, the authorized UE 20 may return a subscription authorization to the unauthorized UE 25. In this implementation, the unauthorized UE 25 may then forward the subscription authorization, or a processed subscription authorization, to the application server 12 following the signalling steps described with reference to FIGS. 3A and 3B.

Figure 4:
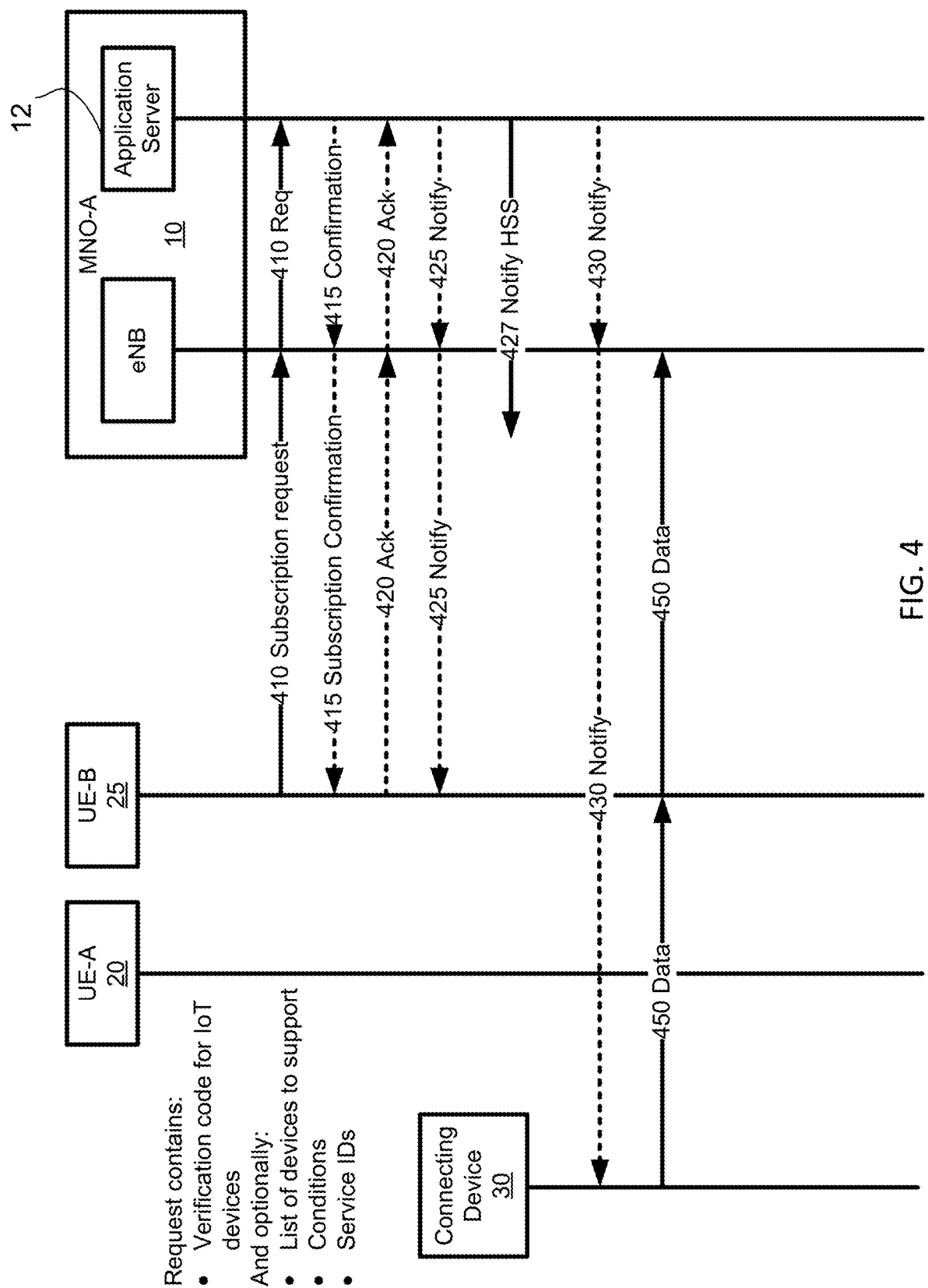
FIG. 4 illustrates an implementation of a system for submitting a subscription request for relaying data.

Referring to FIG. 4, in an embodiment the authorization may be conducted without the assistance of the authorized UE 20. In the embodiment, in step 410 the unauthorized UE 25 transmits a subscription request to the application server 12. In step 415 the application server 12 transmits a subscription confirmation to the unauthorized UE 25. Optionally, the unauthorized UE 25 and application server 12 may exchange further acknowledgements and notification messages in steps 420 and 425 to complete the subscription and exchange any required authentication information. Also optionally, the application server 12 may transmit a notification to HSS in step 427. In some implementations, the application server 12 provides the HSS. In these implementations, the notification to the HSS comprises an internal process of the application server 12.

In step 430 the application server 12 transmits a notification directly to the connecting device 30, notifying the connecting device 30 of the handover to the unauthorized UE 25. The notification including an unauthorized UE identifier. In step 450, the connecting device 30 exchanges data with the network 10 using the unauthorized UE 25 to transmit data received from the connecting device 30, to a node in the subscribed network A 10.

Those skilled in the art will appreciate that in the above discussions, a first UE is authorized to connect to a mobile network and provides authentication to a second UE that has been referred to as an unauthorized UE. There are contemplated scenarios in which the second UE is authorized to access the network under its own credentials, but instead uses the authorization credential of the first UE to allow for billing of data usage to the first UE, or a third party UE, for the services and data exchange related to the subscription request.

In some embodiments, it will be understood that a UE that receives an authorization credential for access from another UE may be permitted to transfer that access to a third UE. The transfer of access rights may be restricted (or even prohibited) by some carriers, and is often to be restricted to conditions that are no broader than the set of rights authorized by the original authorized UE. The delegation of authorization may be restricted either by the first UE to provide authorization, or by the network. In some cases, transfer from a second UE to a third UE may be subject to more restrictive conditions. In other cases, there may be a limit on the number of times the access rights can be delegated.

Figure 5:
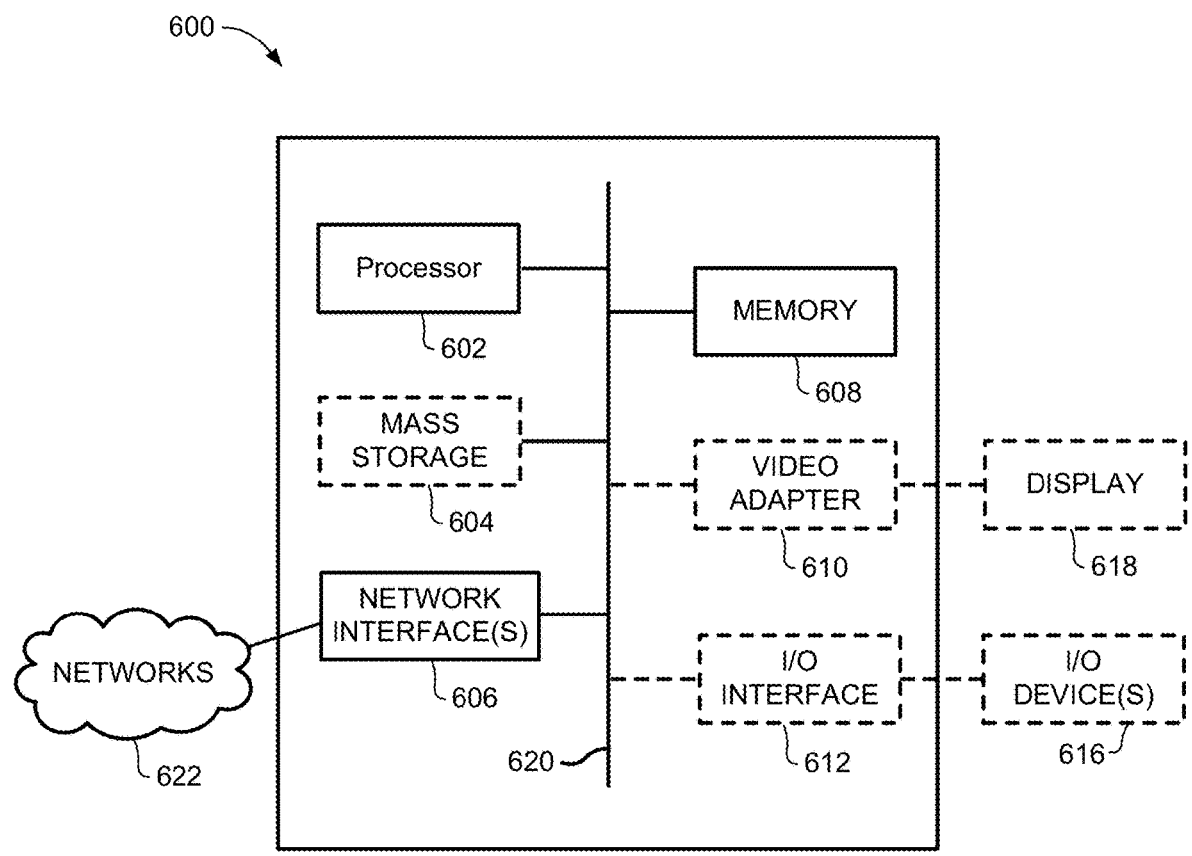
FIG. 5 is a block diagram illustrating an embodiment of a computing system.

FIG. 5 is a block diagram of a computing system 600 that may be used for implementing the devices and methods disclosed herein. The authorized UE 20, unauthorized UE 25, connecting device 30, application server 12, and eNB described herein may each comprise a computing system 600 adapted to perform the methods described herein.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 600 includes a processor 602. The processor 602, which may comprise any type of electronic data processor, may include one or more cores or processing elements. The computing system 600 may further include a bus 620 a memory 608, a video adapter 610, an I/O interface 612 (shown in dashed lines), and may optionally also include a mass storage device 604. The computing system 600 may further include one or more network interface(s) 606 for connecting the computing system 600 to communication networks 622. In an implementation, the network interface 606 includes a radio access network interface operative to exchange communications with a radio access network.

The memory 608 may comprise any type of non-transitory system memory such as static random access memory (SRAM), dynamic random access memory (DRAM), synchronous DRAM (SDRAM), read-only memory (ROM), or a combination thereof. In an embodiment, the memory 608 may include ROM for use at boot-up, and DRAM for program and data storage for use while executing programs. The memory operative to store non-transitory computer executable code for execution by the processing unit to carry out the methods described herein. The bus 620 may be one or more of any type of several bus architectures including a memory bus or memory controller, a peripheral bus, or a video bus.

The mass storage 604 may comprise any type of non-transitory storage device configured to store data, programs, and other information and to make the data, programs, and other information accessible via the bus 620. The mass storage 604 may comprise, for example, one or more of a solid state drive, hard disk drive, a magnetic disk drive, or an optical disk drive.

The video adapter 610 and the I/O interface 612 provide optional interfaces to couple external input and output devices to the processing unit 602. Examples of input and output devices include a display 618 coupled to the video adapter 610 and an I/O device 616 such as a touch-screen coupled to the I/O interface 612. Other devices may be coupled to the processing unit 602, and additional or fewer interfaces may be utilized. For example, a serial interface such as Universal Serial Bus (USB) (not shown) may be used to provide an interface for an external device. Alternatively, the computing system 600 may rely upon the network interface(s) 606 for connection to available mass storage(s), video adapter(s) 610, and I/O interface(s) 612 available on the networks 622.

In an embodiment, a method is provided for connecting an unauthorized UE to a network to exchange data. The method may include the unauthorized UE: transmitting towards an application server on the network a subscription request seeking authorization for an unauthorized UE, the subscription request including an unauthorized UE identifier; receiving a subscription confirmation confirming authorization for the unauthorized UE including an authentication credential; and, exchanging data with the network based on the authentication credential.

In an implementation, before the subscription request is transmitted, the method further comprises the unauthorized UE: receiving a subscription request to exchange data on behalf of a connecting device; and, transmitting the subscription request to the network for the connecting device.

In an embodiment, a method is provided for connecting an unauthorized UE to a network to exchange data, comprising an authorized UE: transmitting to an application server on the network a subscription request seeking authorization for an unauthorized UE, the subscription request including an unauthorized UE identifier; receiving a subscription confirmation confirming authorization for the unauthorized UE including an authentication credential; and, transmitting the authentication credential to the unauthorized UE.

In an implementation, after the receiving the subscription confirmation, the method further comprises the authorized UE: transmitting a handover notification to a connecting device including the unauthorized UE identifier, the handover notification enabling the connecting device to access the network through the unauthorized UE.

Unless defined otherwise, all technical and scientific terms used herein have the same meaning as commonly understood by one of ordinary skill in the art to which this invention belongs.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A User Equipment (UE) comprising:
a processor
a radio access network interface;
a non-transitory memory for storing instructions that when executed by the processor cause the UE to:
receive an authentication credential previously used by a previously authorized other UE for authentication and authorization of said other UE, transmit a subscription request to an application server seeking authorization for the UE to exchange data with a network, the subscription request including the authentication credential, wherein prior to transmission of the subscription request the UE is unauthorized to exchange data with the network;

wherein before the application server transmits the subscription confirmation, the application server further transmits to the previously authorized other UE a verification request including an identifier and the authentication credential of the UE; and, receives an acknowledgement authenticating the verification request;

receive data from a connecting device, wherein the connecting device is an electronic device other than: said UE and said other UE, the electronic device relying on said UE to access the network; and, responsive to receipt of a subscription confirmation confirming the UE is authorized to make the subscription request, transmit the data received from the connecting device to a node in the network using an authorization credential included in the subscription confirmation.

2. The UE of claim 1 wherein the authentication credential is received by the UE from the previously authorized other UE.

3. The UE of claim 1 wherein the authentication credential is received by the UE from an application server available on the network.

4. The UE of claim 1 wherein the authorization credential includes an identification of an entity responsible for accepting charging for the data exchanged between the UE and the network.

5. The UE of claim 4 wherein the entity is one of the previously authorized other UE, the connecting device, and an application server available on the network.

6. The UE of claim 1, wherein transmitting the subscription request comprises:
transmitting the subscription request towards an application server available on the network.

7. A method for an application server exchanging data over a network, the method comprising:
at the application server:
receiving a subscription request seeking authorization for an unauthorized UE to exchange data with the network, the subscription request including an unauthorized UE identifier and an authentication credential previously used by a previously authorized other UE for authentication and authorization of said other UE,
confirming that the unauthorized UE is authorized to make the subscription request by: transmitting, to the previously authorized other UE, a verification request including an identifier and the authentication credential of the UE; and, receiving an acknowledgement authenticating the verification request;
responsive to successfully confirming that the unauthorized UE is authorized to make the subscription request, transmitting a subscription confirmation to the unauthorized UE, the subscription confirmation including an authorization credential;
receiving, data originating from a connecting device, wherein the connecting device is an electronic device other than: said unauthorized UE and said other UE, the electronic device relying on said unauthorized UE to access the network, the data sent via the unauthorized UE and communicated from the unauthorized UE to the network using the authorization credential; and accepting charging for the data when the data is communicated under the authorization credential.

8. The method of claim 7, wherein the subscription request is received from the previously authorized other UE that is currently authorized to exchange data with the network.

9. The method of claim 7, wherein the verification request is transmitted to at least one of:
the previously authorized other UE;
a connecting device; and,
a second application server.

10. The method of claim 7, wherein before the application server transmits the subscription confirmation, the method comprises:
transmitting the unauthorized UE identifier to a second application server on a second network; and,
receiving authentication of the unauthorized UE from the second application server.

11. The method of claim 7, wherein the connecting device is any one of: the previously authorized other UE, the unauthorized UE, and a Machine Type Communications Device.

12. An application server comprising:
a processor
a network interface;
a non-transitory memory for storing instructions that when executed by the processor cause the application server, to:
recieve a subscription request seeking access authorization for an unauthorized UE to exchange data with a network, the subscription request including an unauthorized UE identifier and an authentication credential previously used by a previously authorized other UE for authentication and authorization of said other UE,
confirm that the unauthorized UE is authorized to make the subscription request by: transmitting, to the previously authorized other UE, a verification request including an identifier and the authentication credential of the UE; and, receiving an acknowledgement authenticating the verification request;
responsive to successfully confirming that the unauthorized UE is authorized to make the subscription request, transmit a subscription confirmation to the unauthorized UE, the subscription confirmation including an authorization credential;
receive, from the unauthorized UE using the authorization credential, data originating from a connecting device, wherein the connecting device is an electronic device other than: said unauthorized UE and said other UE, the electronic device relying on said unauthorized UE to access the network; and
accept charging for the data when the data is communicated under the authorization credential.

13. The application server of claim 12, wherein the subscription request is received from the previously authorized other UE.

14. The application server of claim 12, wherein the verification request is transmitted to at least one of:
the previously authorized other UE;
a connecting device; and,
a second application server.

15. The application server of claim 12, wherein before the application server transmits the subscription confirmation, the application server is operable to:
transmit the unauthorized UE identifier to a second application server on a second network; and, receive a notification from the second application server that the unauthorized UE is authorized to make the subscription request.

16. The application server of claim 12, wherein the connecting device is any one of: the previously authorized other UE, the unauthorized UE, and a Machine Type Communications Device.

17. A method for a UE exchanging data over a network, the method comprising:

at the UE:

receiving an authentication credential previously used by a previously authorized other UE for authentication and authorization of said other UE;

sending a subscription request to an application server seeking authorization for the UE to exchange data with a network, the subscription request including the authentication credential, wherein prior to the subscription request the UE is unauthorized to exchange data with the network;

wherein before the application server transmits the subscription confirmation, the application server further transmits to the previously authorized other UE a verification request including an identifier and the authentication credential of the UE; and, receives an acknowledgement authenticating the verification request; and, receiving data from a connecting device, wherein the connecting device is an electronic device other than: said UE and said other UE, the electronic device relying on said UE to access the network; and, responsive to receipt of a subscription confirmation confirming authorization for the UE is authorized to make the subscription request, transmitting the received data to a node in the subscribed network using an authorization credential included in the subscription confirmation.

18. The method of claim 17, further wherein the authentication credential is received by the UE from the previously authorized other UE.

19. The method of claim 17, wherein the authentication credential is received by the UE from an application server available on the network.

20. The method of claim 17, wherein the authentication credential includes an identification of an entity responsible for accepting charging for the data exchanged between the UE and the network.

21. The method of claim 20, wherein the entity is one of the previously authorized other UE, the connecting device, and an application server available on the network.

22. The method of claim 17, wherein transmitting the subscription request to a network comprises further comprises:

transmitting the subscription request towards an application server available on the network.

* * * * *